(12) United States Patent  
Schall

(10) Patent No.: US 8,950,113 B1
(45) Date of Patent: Feb. 10, 2015

(54) POTTED TREE SUPPORT ASSEMBLY

(71) Applicant: Randy Schall, Sioux Falls, SD (US)

(72) Inventor: Randy Schall, Sioux Falls, SD (US)

( * ) Notice: Subject to any disclaimer, the term of this patent is extended or adjusted under 35 U.S.C. 154(b) by 68 days.

(21) Appl. No.: 13/895,728

(22) Filed: May 16, 2013

(51) Int. Cl.
  *B65D 25/06* (2006.01)
  *A01G 9/02* (2006.01)
  *B65D 85/52* (2006.01)

(52) U.S. Cl.
  CPC ...................................... *B65D 85/52* (2013.01)
  USPC ................... 47/85; 47/86; 220/533; 220/552; 220/544

(58) Field of Classification Search
  USPC ......... 47/85, 74, 65.9, 86; 220/510, 529, 528, 220/532, 533, 552, 4.31, 544; 206/386, 600
  See application file for complete search history.

(56) References Cited

U.S. PATENT DOCUMENTS

| | | | | |
|---|---|---|---|---|
| 3,184,095 | A * | 5/1965 | Brandon et al. | 220/510 |
| 3,656,650 | A * | 4/1972 | Frater | 220/533 |
| 3,920,144 | A * | 11/1975 | Callen | 220/533 |
| 4,190,172 | A * | 2/1980 | Box | 220/510 |
| 5,425,198 | A * | 6/1995 | Coy | 47/18 |
| 5,429,236 | A * | 7/1995 | Evans | 206/386 |
| 5,595,021 | A * | 1/1997 | Ripley et al. | 47/66.5 |
| 5,833,336 | A * | 11/1998 | Dean | 312/293.2 |
| 7,163,118 | B2 * | 1/2007 | Cheng | 220/528 |
| 7,588,162 | B2 * | 9/2009 | Dube et al. | 220/552 |
| 8,590,726 | B1 * | 11/2013 | Mickelson et al. | 220/533 |

* cited by examiner

*Primary Examiner* — Kristen C Hayes

(57) ABSTRACT

A potted tree support assembly includes a housing with a bottom wall and a perimeter wall. A plurality of interlocking slats is positionable in the housing to define a plurality of compartments each configured for receiving a base of a tree therein. A plurality of slots extends into an inner surface of the perimeter wall. Each of the slots has an associated opposing slot extending into the perimeter wall to define an aligned pair of the slots. Each of the slats has a pair of opposed ends and the opposed ends of each of the slats is removably positionable in a selectable one of the aligned pair of the slots. A plurality of legs is coupled to and extends downwardly from a bottom surface of the bottom wall.

14 Claims, 6 Drawing Sheets

POTTED TREE SUPPORT ASSEMBLY

CROSS-REFERENCE TO RELATED APPLICATIONS

This application claims benefit of the U.S. patent application Ser. No. 13/531,755 filed on Jun. 25, 2012 under Title 35 U.S.C. §120.

BACKGROUND OF THE DISCLOSURE

Field of the Disclosure

The disclosure relates to potted plant supporting devices and more particularly pertains to a new potted plant supporting device for supporting potted trees in an upright manner such that the potted trees are not easily toppled by high winds.

SUMMARY OF THE DISCLOSURE

An embodiment of the disclosure meets the needs presented above by generally comprising a housing that has a bottom wall and a perimeter wall attached to and extending upwardly from the bottom wall. The perimeter wall has an inner surface and an outer surface. The perimeter wall bounds an enclosed space and the bottom wall has a generally rectangular shape. A plurality of interlocking slats is provided. The slats are selectively positionable in the enclosed space to define a plurality of compartments in the enclosed space. Each of the compartments is configured for receiving a base of a tree therein whereby the tree is supported in an upright position. A plurality of slots extends into the inner surface of the perimeter wall. The perimeter wall includes four walls and each of the four walls has a plurality of the slots therein. Each of the slots extends through the upper edge and down to the bottom wall, wherein each of the slots has an associated opposing slot extending into the perimeter wall to define an aligned pair of the slots. Each of the slats has a pair of opposed ends and the opposed ends of each of the slats is removably positionable in a selectable one of the aligned pair of the slots. A plurality of legs is coupled to and extends downwardly from a bottom surface of the bottom wall. The legs are spaced apart whereby the legs are configured for receiving a lift and the housing is selectively supportable on the lift.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
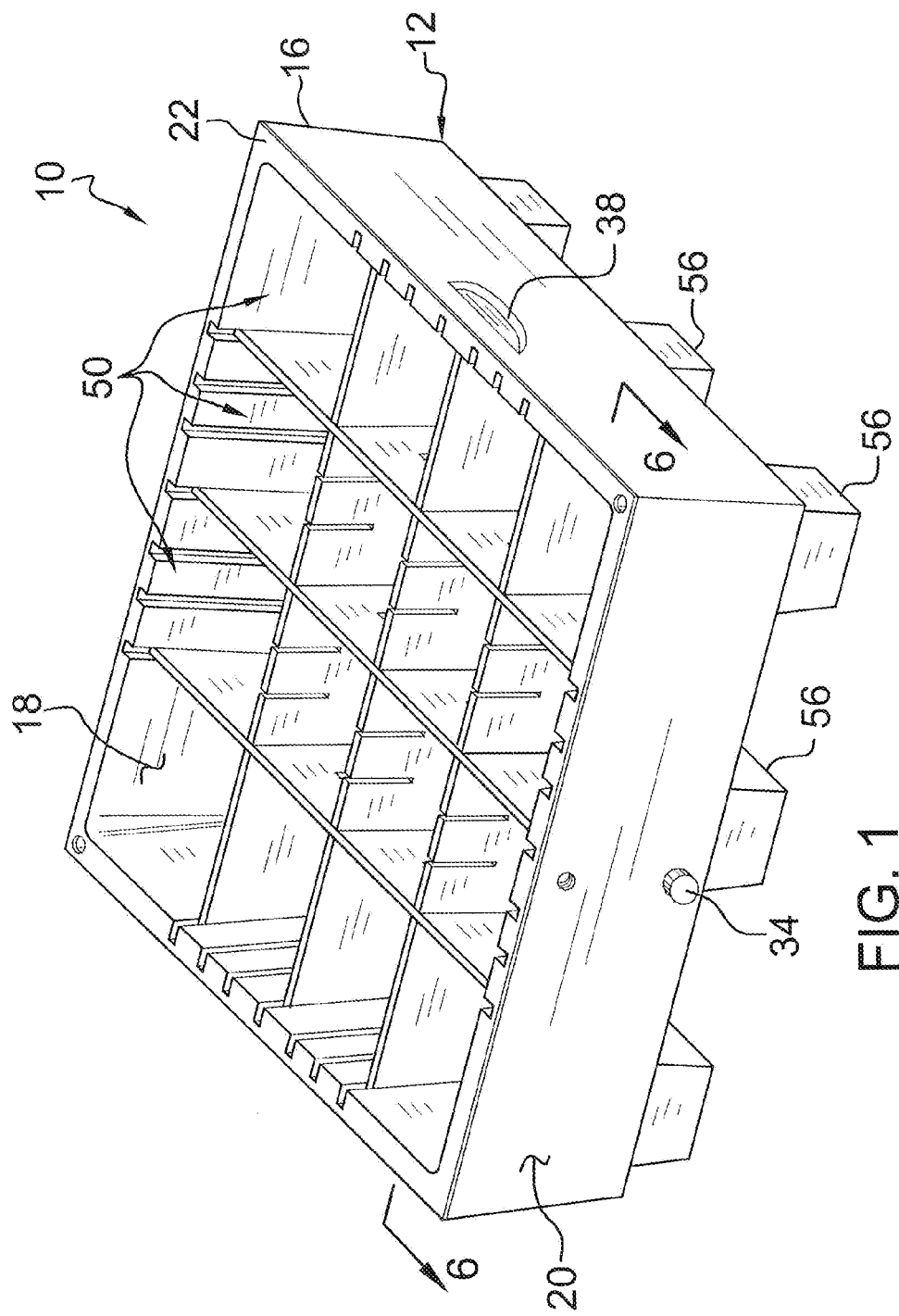
FIG. 1 is a top right perspective view of a potted tree support assembly according to an embodiment of the disclosure.
Figure 2:
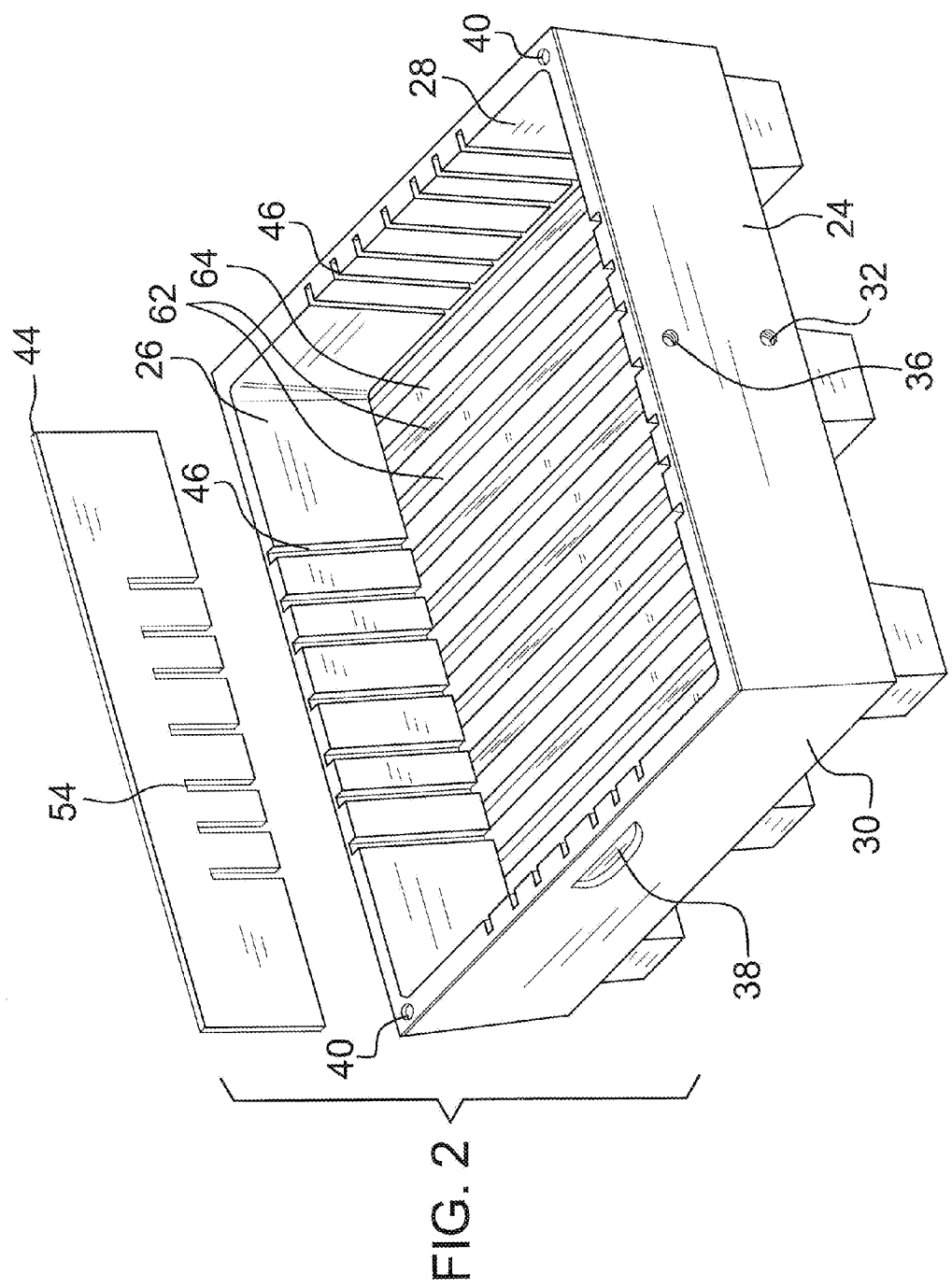
FIG. 2 is a top left perspective view of an embodiment of the disclosure.
Figure 3:
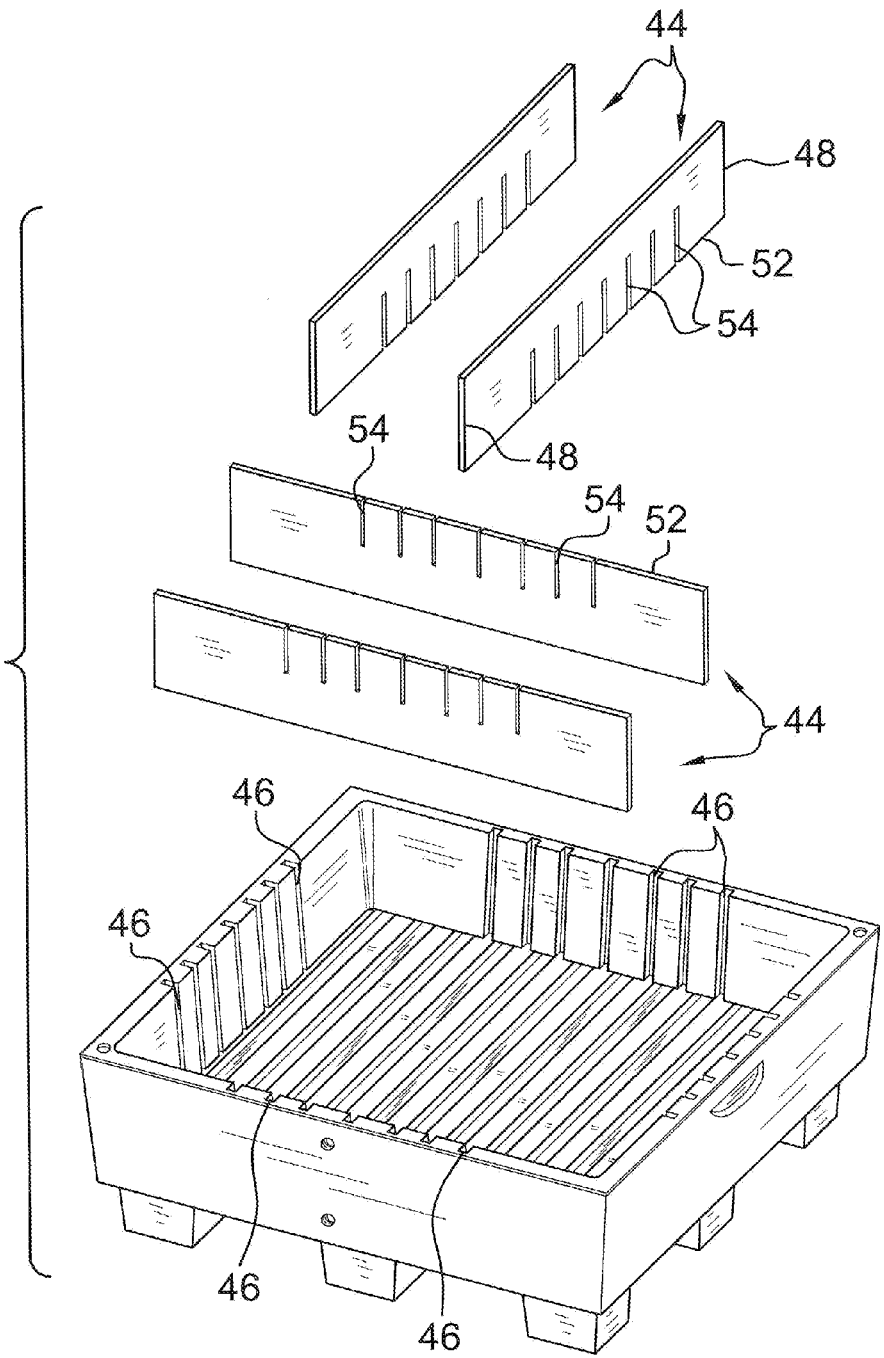
FIG. 3 is a top perspective view of an embodiment of the disclosure.
Figure 4:
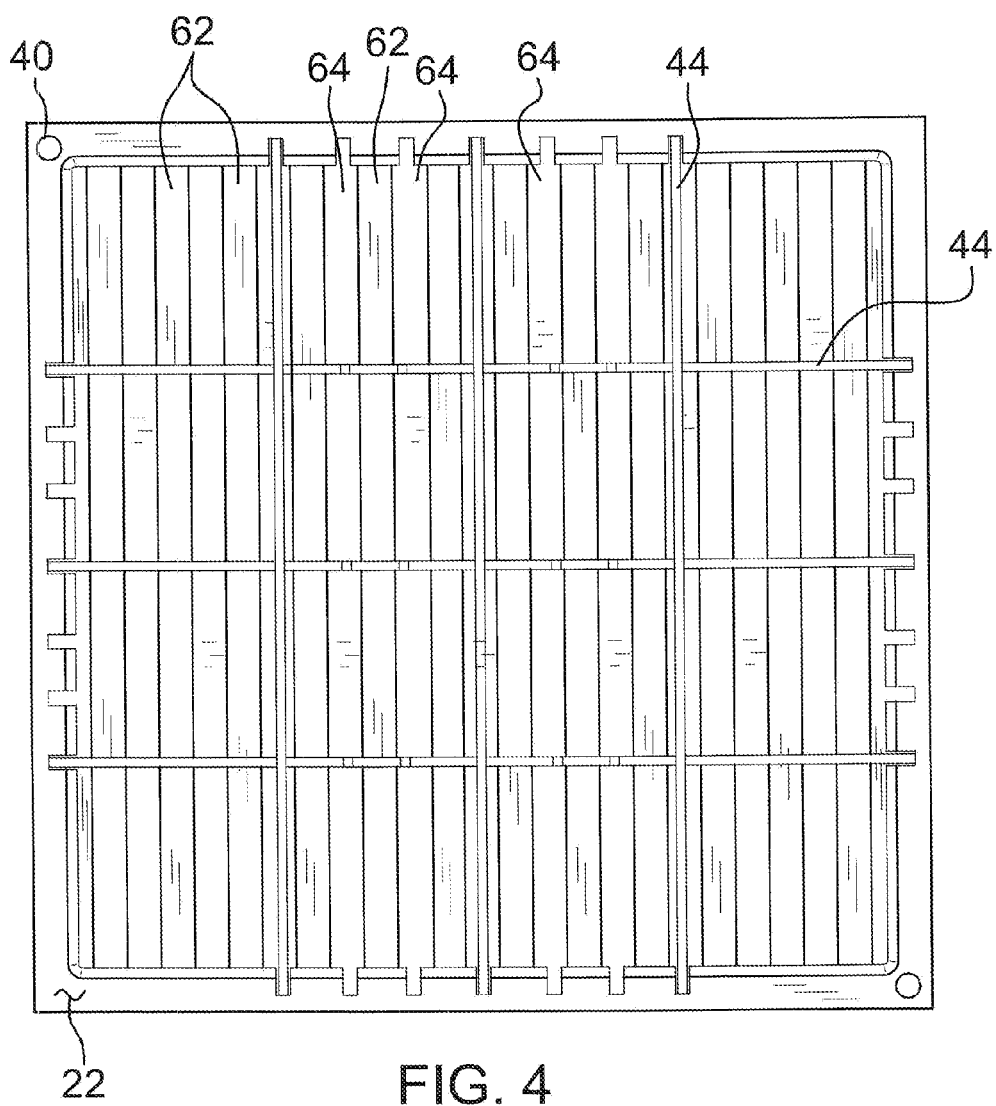
FIG. 4 is a top view of an embodiment of the disclosure.
Figure 5:
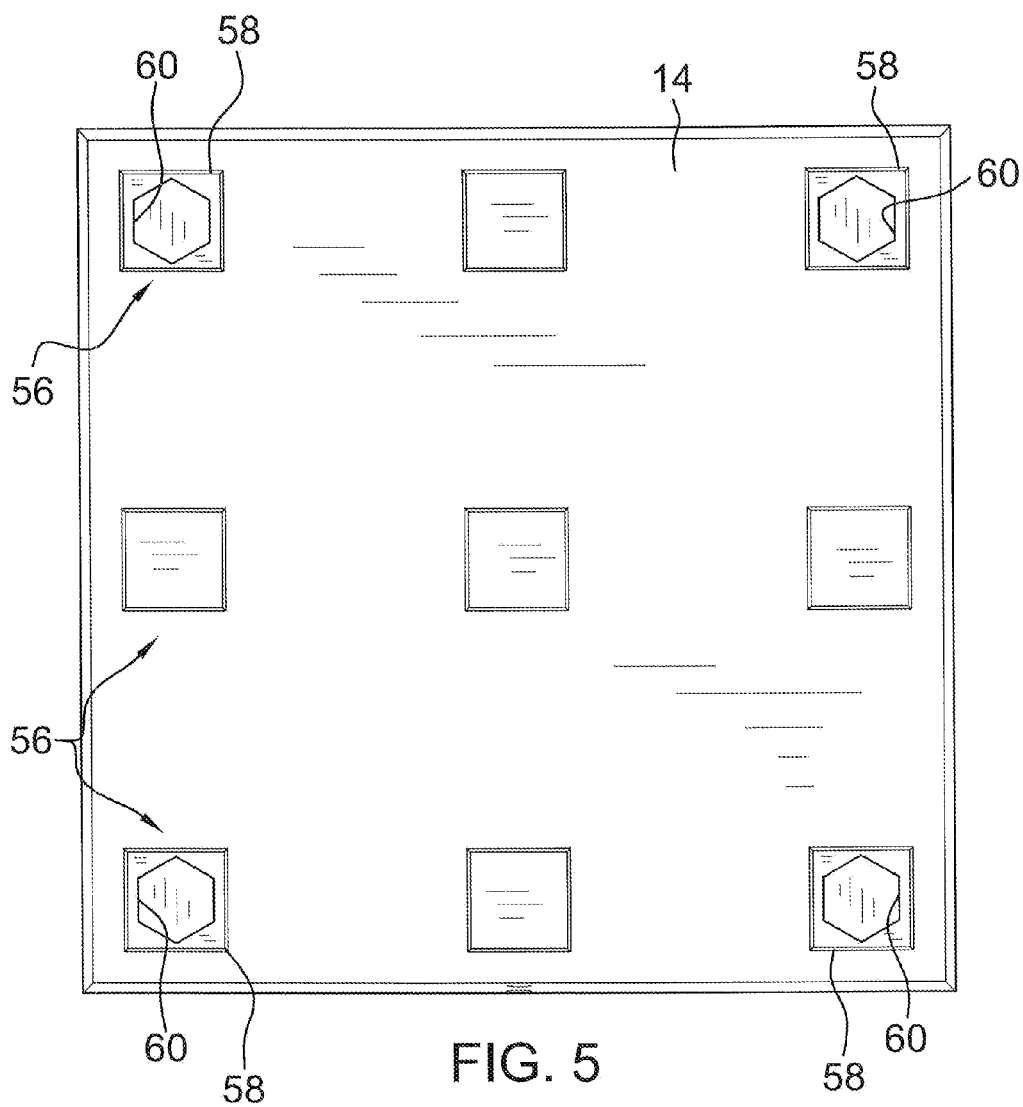
FIG. 5 is a bottom view of an embodiment of the disclosure.

With reference now to the drawings, and in particular to FIGS. 1 through 7 thereof, a new potted plant supporting device embodying the principles and concepts of an embodiment of the disclosure and generally designated by the reference numeral 10 will be described.

As best illustrated in FIGS. 1 through 7, the potted tree support assembly 10 generally comprises a housing 12 that has a bottom wall 114 and a perimeter wall 16 attached to and extending upwardly from the bottom wall 14. The perimeter wall 16 has an inner surface 18 and an outer surface 20 and the perimeter wall 16 bounds an enclosed space. The bottom wall 14 has a generally rectangular shape and the perimeter wall 16 tapers outwardly from the bottom wall 14 to an upper edge 22 of the perimeter wall 16 to allow nesting of multiple housings 12. The housing 12 may have a length and width each between 45.0 inches and 65.0 inches along the upper edge 22 of the perimeter wall. This may decrease, in each direction, by between 2.0 inches and 6.0 inches at the bottom wall 14. The perimeter wall 16 may have a height generally between 8.0 inches and 16.0 inches.

Figure 6:
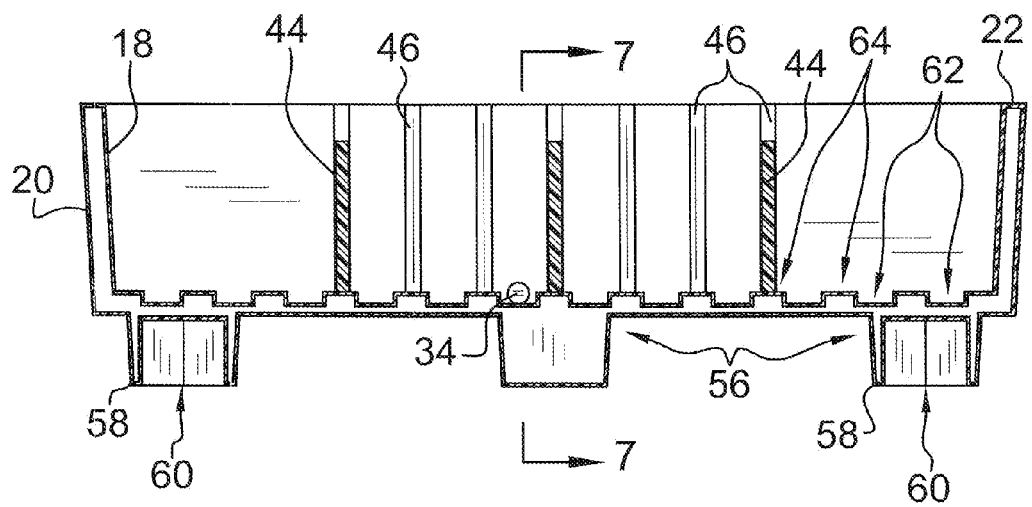
FIG. 6 is a cross-sectional view of an embodiment of the disclosure taken along line 6-6 of FIG. 1.
Figure 7:
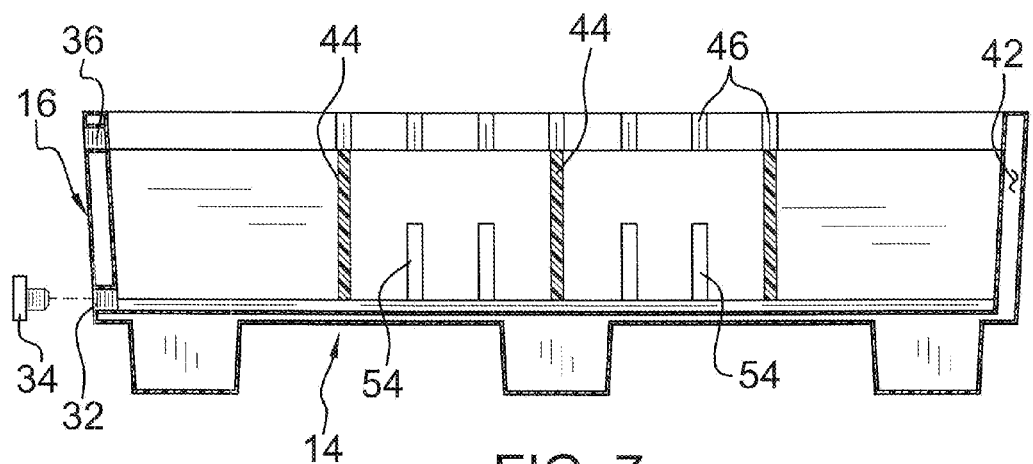
FIG. 7 is a cross-sectional view of an embodiment of the disclosure taken along line 7-7 of FIG. 6.

The perimeter wall 16 may include a front wall 24, rear wall 26, first lateral wall 28 and second lateral wall 30. The front wall 24 has a drain opening 32 extending therethrough adjacent to the bottom wall 14. A plug 34 is removably positionable in the drain opening 32. A well 36 extends into the front wall 24. The well 36 receives the plug 34 when the plug 34 is removed from the drain opening 32 for storage purposes. The well 36 may be positioned nearer to the upper edge 22 than the bottom wall 16. The drain opening 32, plug 34 and well 36 may each be threaded. The perimeter wall 16 also includes a plurality of handles 38. Each of the first 28 and second 30 lateral walls may include at least one of the handles 38. While the handles 38 may include attached handles or raised portions of the perimeter wall, the Figures depict handles 38 extending into the outer surface 20 of the perimeter wall 16. As can be seen in FIGS. 6 and 7, the perimeter 16 and bottom 14 walls may be hollow such they are formed from an inner body and an outer body joined together by a connecting intermediate wall. Holes 40 may extend through the upper edge 22 of the perimeter wall 16 into a space 42 between inner and outer bodies. Should additional weight be required for the assembly 10, sand, water or other fluidic acting material may be poured into the holes 40.

A plurality of interlocking slats 44 is provided. The slats 44 are selectively positionable in the enclosed space to define a plurality of compartments 50 in the enclosed space. Each of the compartments 50 is configured for receiving a base of a tree therein whereby the tree is supported in an upright position. A plurality of slots 46 extends into the inner surface 18 of the perimeter wall 16. The perimeter wall 16 includes the four walls describe above and each of the four walls has a plurality of the slots 46 therein. Each of the slots 46 extends through the upper edge 22 and down to the bottom wall 14. The slots 46 each have an associated opposing slot 46 extending into the perimeter wall 16 to define an aligned pair of the slots 46. The slats 44 each have a pair of opposed ends 48 and the opposed ends 48 of each of the slats 44 is removably positionable in a selectable one of the aligned pair of the slots 46. The slots 46 may be positioned from each other between 4.0 inches and 5.0 inches from each other and further may be positioned along a length of each of the front 24, rear 26, first lateral 28 and second lateral 30 walls. The slots may be equally spaced from each other or their may be variances in the distances between them such that compartments 50 may be made having particular sizes useful to the industry of potted trees, bushes and shrubs. The slats 44 and housing 12 may be comprised of a plastic material.

Each of the slats 44 has an edge 52 having a plurality of spaced slits 54 therein. More particular, the edge 52 will be either a top edge or a bottom edge of the slats 44 depending upon the orientation of the particular slat 44. Each of the slits 54 is in alignment with one of the aligned pair of slots 46 when the opposed ends 48 of the slat 44 are inserted into the aligned pair of slots 46. The slits 54 of one of the slats 44 are engaged with the slits 54 of another of the slats 44 when the slats 44 are engaged with each other. More specifically, downwardly directed slits 54 of one slat 44 are engaged with upwardly directed slits 54 of another one of the slats 44. The slits 54 travel approximately ½ of a height of the slats 44.

A plurality of legs 56 is provided and each is coupled to and extends downwardly from a bottom surface of the bottom wall 14. The legs 56 are spaced apart whereby the legs 56 are configured for receiving a lift such as would be found with a conventional powered or hand driven forklift. The housing 12 is selectively supportable on the lift for transportation of the assembly 10. The plurality of legs 56 includes up to nine legs 56 arranged into three aligned rows of three legs 56. The legs 56 include four corner legs 58 each positioned adjacent to one of the corners of the bottom wall 14. The corner legs 58 have a bottom surface having an aperture 60 extending therein that is configured to receive and support a tree by insertion of a trunk of the tree into an associated one of the apertures 60 when the housing 12 is in an inverted position. Each aperture 60 may be hexagon shaped. A diameter of a cylinder positioned within the aperture 60 may have a maximum diameter of between 3.5 inches and 6.0 inches. The legs 58 may have a height equal to approximately 6.0 inches.

The bottom wall 14 has an upper surface that has a plurality of troughs 62 therein. The troughs 62 each extend between the front wall 24 and the rear wall 26 of the perimeter wall 16. The troughs 62 are divided by raised sections 64 of the bottom wall 14 and each of the slots 46 in the front 24 and rear 26 walls is aligned with one of the raised sections 64. Thus, when water is placed in the housing 12, it is not blocked from flowing by slats 44 positioned within the troughs 62. While the troughs 62 may be angled from the rear wall 26 to the front wall 24, this is not required. The troughs 62 will generally have a width between 1.0 inches and 3.0 inches and a depth of 1.0 inches or less.

In use, the slats 44 are positioned where needed within the enclosed space such that the compartments 50 formed by the slats 44 conform to the size of the pot in which a tree or other tall plant is potted. The term "tree" is used to describe any plant but may in particular be used with respect to various wooded trees, shrubs and bushes. The housing 12 may be filled partially with water by plugging the drain opening 32 or it may be allowed to drain by removing the plug 34. The drain opening 32 will be positioned at the same level as the upper surface of the bottom wall 14 so that excess water, if not wanted, will be drained from the housing 12. The pots will rest upon the raised sections 62 to ensure proper drainage therefrom. The pots, being positioned within the compartments 50, will be highly resistant to falling over during high winds from storms and the like while the housing 12 allows for proper irrigation of the pots.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant displaying assembly comprising:

a housing having a bottom wall and a perimeter wall being attached to and extending upwardly from said bottom wall, said perimeter wall having an inner surface and an outer surface, said perimeter wall bounding an enclosed space, said bottom wall having a generally rectangular shape;

a plurality of interlocking slats, said slats being selectively positionable in said enclosed space, said slats defining a plurality of compartments in said enclosed space, each of said compartments being configured for receiving a base of a tree therein whereby the tree is supported in an upright position;

a plurality of slots extending into said inner surface of said perimeter wall, said perimeter wall including four walls, each of said four walls having a plurality of said slots therein, each of said slots extending through said upper edge and down to said bottom wall, wherein each of said slots has an associated opposing slot extending into said perimeter wall to define an aligned pair of said slots;

each of said slats having a pair of opposed ends, said opposed ends of each of said slats being removably positionable in a selectable one of said aligned pair of said slots; and a plurality of legs coupled to and extending downwardly from a bottom surface of said bottom wall, said legs being spaced apart whereby said legs are configured for receiving a lift, whereby said housing is selectively supportable on the lift.

2. The plant displaying assembly according to claim 1, wherein said perimeter wall tapers outwardly from said bottom wall to an upper edge of said perimeter wall to allow nesting of multiple housings.

3. The plant displaying assembly according to claim 1, wherein each of said slats having an edge having a plurality of spaced slits therein, each of said slits being in alignment with one of said aligned pair of slots when said opposed ends of said slat are inserted into said aligned pair of slots, wherein said slits of one of said slats are engaged with said slits of another of said slats when said slats are engaged with each other.

4. The plant displaying assembly according to claim 1, wherein said plurality of legs including nine legs being arranged into three aligned rows of three legs.

5. The plant displaying assembly according to claim 4, wherein said legs include four corner legs each positioned adjacent to one of said corners of said bottom wall, each of said corner legs having a bottom surface having an aperture extending therein, each aperture being configured to receive and support a trees by insertion of a trunk of the tree into an associated one of said apertures when said housing is in an inverted position.

6. The plant displaying assembly according to claim 5, wherein each aperture is hexagon shaped.

7. The plant displaying assembly according to claim 1, wherein said bottom wall has an upper surface having a plurality of troughs therein, said troughs each extending between a front wall and a rear wall of said perimeter wall.

8. The plant displaying assembly according to claim 7, wherein said troughs are divided by raised sections of said bottom wall, each of said slots in said front and rear walls being aligned with one of said raised sections.

9. The plant displaying assembly according to claim 7, wherein said front wall has a drain opening extending therethrough adjacent to said bottom wall, a plug being removably positionable in said drain opening.

10. The plant displaying assembly according to claim 9, wherein a well extends into said front wall, said well receiving said plug when said plug is removed from said drain opening.

11. The plant displaying assembly according to claim 1, wherein said perimeter wall includes a plurality of handles.

12. The plant displaying assembly according to claim 11, wherein said perimeter wall includes a first lateral wall and a second lateral wall, each of said first and second lateral walls including at least one of said handles.

13. The plant displaying assembly according to claim 11, wherein each of said handles extends into said outer surface of said perimeter wall.

14. A plant displaying assembly comprising:
- a housing having a bottom wall and a perimeter wall being attached to and extending upwardly from said bottom wall, said perimeter wall having an inner surface and an outer surface, said perimeter wall bounding an enclosed space, said bottom wall having a generally rectangular shape, said perimeter wall tapering outwardly from said bottom wall to an upper edge of said perimeter wall to allow nesting of multiple housings;
- a plurality of interlocking slats, said slats being selectively positionable in said enclosed space, said slats defining a plurality of compartments in said enclosed space, each of said compartments being configured for receiving a base of a tree therein whereby the tree is supported in an upright position;
- a plurality of slots extending into said inner surface of said perimeter wall, said perimeter wall including four walls, each of said four walls having a plurality of said slots therein, each of said slots extending through said upper edge and down to said bottom wall, wherein each of said slots has an associated opposing slot extending into said perimeter wall to define an aligned pair of said slots;
- each of said slats having a pair of opposed ends, said opposed ends of each of said slats being removably positionable in a selectable one of said aligned pair of said slots;
- each of said slats having an edge having a plurality of spaced slits therein, each of said slits being in alignment with one of said aligned pair of slots when said opposed ends of said slat are inserted into said aligned pair of slots, wherein said slits of one of said slats are engaged with said slits of another of said slats when said slats are engaged with each other;
- a plurality of legs coupled to and extending downwardly from a bottom surface of said bottom wall, said legs being spaced apart whereby said legs are configured for receiving a lift, whereby said housing is selectively supportable on the lift, said plurality of legs including nine legs being arranged into three aligned rows of three legs, said legs including four corner legs each positioned adjacent to one of said corners of said bottom wall, each of said corner legs having a bottom surface having an aperture extending therein, each aperture being configured to receive and support a trees by insertion of a trunk of the tree into an associated one of said apertures when said housing is in an inverted position, each aperture being hexagon shaped;
- said bottom wall having an upper surface having a plurality of troughs therein, said troughs each extending between a front wall and a rear wall of said perimeter wall, said troughs being divided by raised sections of said bottom wall, each of said slots in said front and rear walls being aligned with one of said raised sections;
- said front wall having a drain opening extending therethrough adjacent to said bottom wall, a plug being removably positionable in said drain opening;
- a well extending into said front wall, said well receiving said plug when said plug is removed from said drain opening, said well being positioned nearer to said upper edge than said bottom wall; and
- said perimeter wall including a plurality of handles, said perimeter wall including a first lateral wall and a second lateral wall, each of said first and second lateral walls including at least one of said handles, each of said handles extending into said outer surface of said perimeter wall.

* * * * *